United States Patent [19]

Heyer et al.

[11] Patent Number: 4,782,693

[45] Date of Patent: Nov. 8, 1988

[54] PROCESS FOR CHECKING AND/OR ADJUSTING AND/OR ASSEMBLING VALVES AND ARRANGEMENT AND DEVICE FOR CARRYING OUT THE PROCESS

[75] Inventors: Rainer Heyer, Mülheim; Günter Stiefeling, Heiligenhaus; Bernd Portmann, Kaarst; Josef Otulak, Dormagen, all of Fed. Rep. of Germany

[73] Assignee: Pierburg Luftfahrtgeräte Union GmbH, Neuss, Fed. Rep. of Germany

[21] Appl. No.: 76,291

[22] Filed: Jul. 22, 1987

[30] Foreign Application Priority Data

Jul. 24, 1986 [DE] Fed. Rep. of Germany ....... 3624750

[51] Int. Cl.⁴ ............................................ G01M 15/00

[52] U.S. Cl. ..................................... 73/119 A; 901/44

[58] Field of Search .......................... 73/119 A, 865.8; 901/44, 46; 364/481, 506, 579, 580

[56] References Cited

U.S. PATENT DOCUMENTS 4,428,228 1/1984 Banzhaf et al. .................. 73/119 A

FOREIGN PATENT DOCUMENTS 0088591 9/1983 European Pat. Off. .
0164563 12/1985 European Pat. Off. .
704774 12/1979 U.S.S.R. ................................ 901/44
1383093 2/1975 United Kingdom .

OTHER PUBLICATIONS

Technical Review 47/85, pp. 36 to 41.
Technical Review 24/85, pp. 12 to 15.

*Primary Examiner*—Jerry W. Myracle
*Attorney, Agent, or Firm*—Toren, McGeady & Associates

[57] ABSTRACT

In a process for checking and/or adjustment and/or assembly of valves, in particular electronically controlled injection valves for internal combustion engines, in which the valves are conveyed along a test line having successive test stands, a test line that is fully automatic and thus free from disturbing effects of manual or semi-manual operation, with optimized flow of material and objective measurement or test results, can be obtained by coordinating computer-controlled transport systems with one another and with computer-controlled test stands by use of a higher-level control.

12 Claims, 5 Drawing Sheets

PROCESS FOR CHECKING AND/OR ADJUSTING AND/OR ASSEMBLING VALVES AND ARRANGEMENT AND DEVICE FOR CARRYING OUT THE PROCESS

TECHNICAL FIELD OF THE INVENTION

The invention relates to a process for checking and/or adjusting and/or assembling valves, especially electronically controlled injection valves for internal combustion engines, in which the valve is conveyed along a test line comprising successive test stands, and to an arrangement and a device for carrying out the process.

BACKGROUND OF THE INVENTION AND PRIOR ART

In the case of mixture generating apparatus, the injection valves used are very important, and this requires precise checking and adjustment, especially of electronically controlled injection valves. Besides combined production and testing lines for checking, adjusting and assembling valves, in which some functions are performed manually, e.g. placing valves in the test stands, automated systems are also known.

In known automated testing and assembly lines, injection valves carried on pallets are transported on conveyor devices, e.g. creeper or slatted belts, by frictional drive along a test line comprising one or more test stands. Diversion of the pallets into the test stands is done by switching points or other deflectors such as, in particular, elevatable stops or stoppers in conveyor devices that divert a pallet on to the conveyor device that runs at right angles to the main conveyor belt and leads to the test stand. With this arrangement not only is the retardation of the pallet that is being transported at high speed disadvantageous; it also does not allow the transportation time to be precisely fixed, because the acceleration of the pallets cannot be exactly determined; optimized flow of material is thus not ensured. In addition, the known test lines require a large amount of space and the distribution of the pallets and the handling in the individual test stands also requires the expenditure of a large amount of mechanical effort, with the mixing of the individual operations operating to the detriment of ease of keeping track of and servicing of the testing line.

Further not unimportant problems arise in ensuring sufficiently constant pressure and temperature, particularly between the hydraulic measurement circuits of all the test stands. The major problems result from the pulsing of the flowing test medium caused by pumps and test-pieces, and switching and acceleration operations that are involved when changing the test-pieces (in this case, valves).

OBJECT OF THE INVENTION

The object of the invention is to provide a fully automatic test line, free from disturbing effects arising from manual or semi-manual activities, for checking and adjusting, in particular, electronically controlled injection valves.

SUMMARY OF THE INVENTION

According to the invention, this problem is solved by coordinating computer-controlled transport systems both with one another and with computer-controlled test stands, and advantageously in a manner not dependent on timing, by a higher-level control; preferably linear portal transport systems with hanging industrial robots (jointed-arm robots) are used to transport the pallets and test stands with integrated industrial robots (jointed-arm robots) are preferably used to handle the valves. The use of computer-supported test stands or of test cells comprising a plurality of test cells, combined with the use of industrial robots, permits a high degree of automation; in fact with optimized material flow, the measuring steps can be shortened, the results made objective and improved by reduction of errors or disturbances arising from the plant, and the space required can be reduced.

The checking and adjusting steps and the assembly steps can be relocated and distributed around the test cells (automatic machine stands). The linkage of the test stands and/or test cells to optimize the flow of material is achieved by the computer-controlled transport system through electrical interfaces and corresponding signal processing - the transport system operates independently of timing, i.e. on demand by the test cells. The amount of available test cell capacity needed can be matched to the planned production in any given case, so that even taking account of service or installation work and the down cycles of the test cells needed for this, high plant availability and thus also high production, can be achieved. Supplying the test cells with pallets on demand by the test cells shortens the flow of material and reduces the intermediate storage of the test-piece pallets, so that the volume and area requirements of the test line can be considerably reduced.

The testing process can preferably be carried out in the following steps:

1. Loading and unloading test stands of a first test block with pallets carrying valves by means of a first linear-portal transport system;
2. simultaneous connection of all the valves on a pallet to a measuring connection having a hydraulic connection and an electric current connection for each valve;

2.1 testing the valves, namely:

2.1.1 running in the connected valve for a predetermined time;

2.1.2 performance of function tests, e.g. determining the circulatory flow or the through flow;

2.3 storing the test results on an information carrier of the pallet;

3. unloading the test stand, namely:

3.1 picking up the pallet of tested valves;

3.2 transporting the pallet of tested valves into an intermediate store of the first test block;

4. picking up the pallets of tested valves from the intermediate store by a linear portal transport system of a second test block;

4.1 distribution and setting down the pallets in test cells 4.1.1 for performing a leakage test and 4.1.2 for calibration of the valves, 4.2 storing the test results on the information carrier of the pallet;

5. picking up, distribution and setting down of the pallets in test cells 5.1 in which first of all a filter is inserted in the valve and then 5.2 a final test is performed;

5.3 storage of the test results (measurements or fault codes) in the information carrier of the pallet;

6. disposal of the pallets with fully-tested valves by means of the second linear portal transport system, i.e.

6.1 pick-up of the pallets and 6.1 distribution on conveyors for further processing or rectification of valves, or transporting them away.

The running-in time of the valves in the test stands of the first test block is type-dependent; for function testing function measurements are made at constant frequencies and times of opening of the valves. The tested pallets are then set aside by the linear portal transport system in the intermediate store, which preferably has provision for stacking. The intermediate store forms the technical and organizational interface to the second test block.

In the designated cells in the second test block the leakage test is first performed, and then calibration. The leakage test can be performed by means of pressurized test fluid, using as criterion the rate of fall in pressure in a given time. Calibration includes checking of the static through-flow and the setting of one or more dynamic through-flows as test or adjustment criteria. In subsequent test cells, the filter is then automatically inserted and the completed valves are subjected to a final test on separate test stands, the dynamic and static through-flow being taken into particular account in the final test. The transfer or transport of the pallets trough the second test block is done by the jointed-arm robots of the linear portal system, a stock table in each test cell serves as the interface between a test cell and the transport of a pallet. The distribution (separation) of the valves from the pallet is done by the jointed-arm robots integrated in each test cell. Each test cell carries out its operations self-sufficiently, the individual functions of the test cells, that is to say in particular, the flow of material and information, being coordinated by the higher-level control.

The final test in the second test block can advantageously be followed by an acceptance test on a sample of the finally tested valves, in which a percentage of the finally-tested valves is checked. As an example, 10% of the fully-tested valves may be subjected to an acceptance test.

In each test stand of the second test block there is preferably, at least at times, a plurality of pallets with valves. This supports the uninterrupted flow of material, since a pallet with untested valves is always available for the jointed-arm robot at any time.

A preferred arrangement of the test line for carrying out the process comprises a first test block having a first linear portal running transverse to the direction of transport of a pallet supply conveyor and between opposed and mutually aligned test stands for a running-in test of the valves, said first linear portal including a computer controlled jointed-arm robot and an intermediate store in the transfer zone to a second test block, the second test block having a linear portal running in the transport direction, i.e. transverse to the first linear portal, and including a computer-controlled jointed-arm robot and test cells arranged in the zone served by the second linear portal, said test cells comprising at least two test stands and having jointed-arm robots integrated in each test cell, and one or more pallet removing means.

In an advantageous arrangement the second test block has six test cells each with three test stands arranged in a semi-circle around a central jointed-arm robot and in the region of a stock table, of which the test cells following the intermediate store of the first test block (in the direction of transport of the pallets) are adapted to perform a leakage test and subsequent calibration of the valves and the other two test cells each have an automatic machine for fitting a filter and two test stands for a final test. Optimum flow of material can be obtained, since the flexible combination of the test stands gives capacity matching. Different times needed for different test procedures are matched by corresponding numbers and arrangements of the test stands. On the basis of the arrangement chosen, the leakage test and calibration, the insertion of the filter, and the final test can all be performed in the appropriate test stands in optimised times without the flow of material being interrupted.

For acceptance testing of a selected percentage of the finally-tested valves it is advisable to arrange a test stand with a jointed-arm robot at the end of the second linear portal.

Each test stand preferably comprises a computer, a hydraulic section and a carrier to receive a pallet or a single valve. While the test stands of the first test block each test all the valves of a pallet, for which purpose the pallets or the intermediate adapters, each with one valve, can for example be raised by means of a lifting device in the test stand up against the carrier plates having the electric current and hydraulic connections, the jointed-arm robots supply each of the test stands of the test cells of the second test block with a single valve. Preferably a test-piece changing device operating according to the swinging principle is used for this.

A multiple-way valve can be included in the hydraulic measuring circuit of each test stand, through which a by-pass line to a tank line having a throttle valve can be connected. By this means a continuous flow through the measuring section can be prearranged, since the multiple-way valve, in particular a $\frac{3}{4}$-way valve, allows the flow to be switched as desired between measurement of the test-piece and the by-pass line, while the quantity of the flow can be kept as close as possible to the planned operating level by means of the throttle valve. The continuity of flow achieved in this way throughout the whole operating and measuring period eliminates additional build-up times in the measuring section and improves the life of the sensor, since abrupt switching over is avoided.

So that the test fluid can be kept uniform, the tanks of the individual test stands can be connected to a central tank. Similar properties of the test fluid at all the test stands can be achieved by cyclical exchange by circulating the test fluid through the common central tank.

The pallets can advantageously be equipped with interchangeable adaptors to take test pieces of different technical construction. In combination with industrial robots and test-piece adaptors the pallets are then universally usable.

BRIEF DESCRIPTION OF THE DRAWINGS

The invention will now be described in more detail with reference to the exemplary embodiments shown in the drawings, in which.

DESCRIPTION OF PREFERRED EMBODIMENTS OF THE INVENTION

Figure 1:
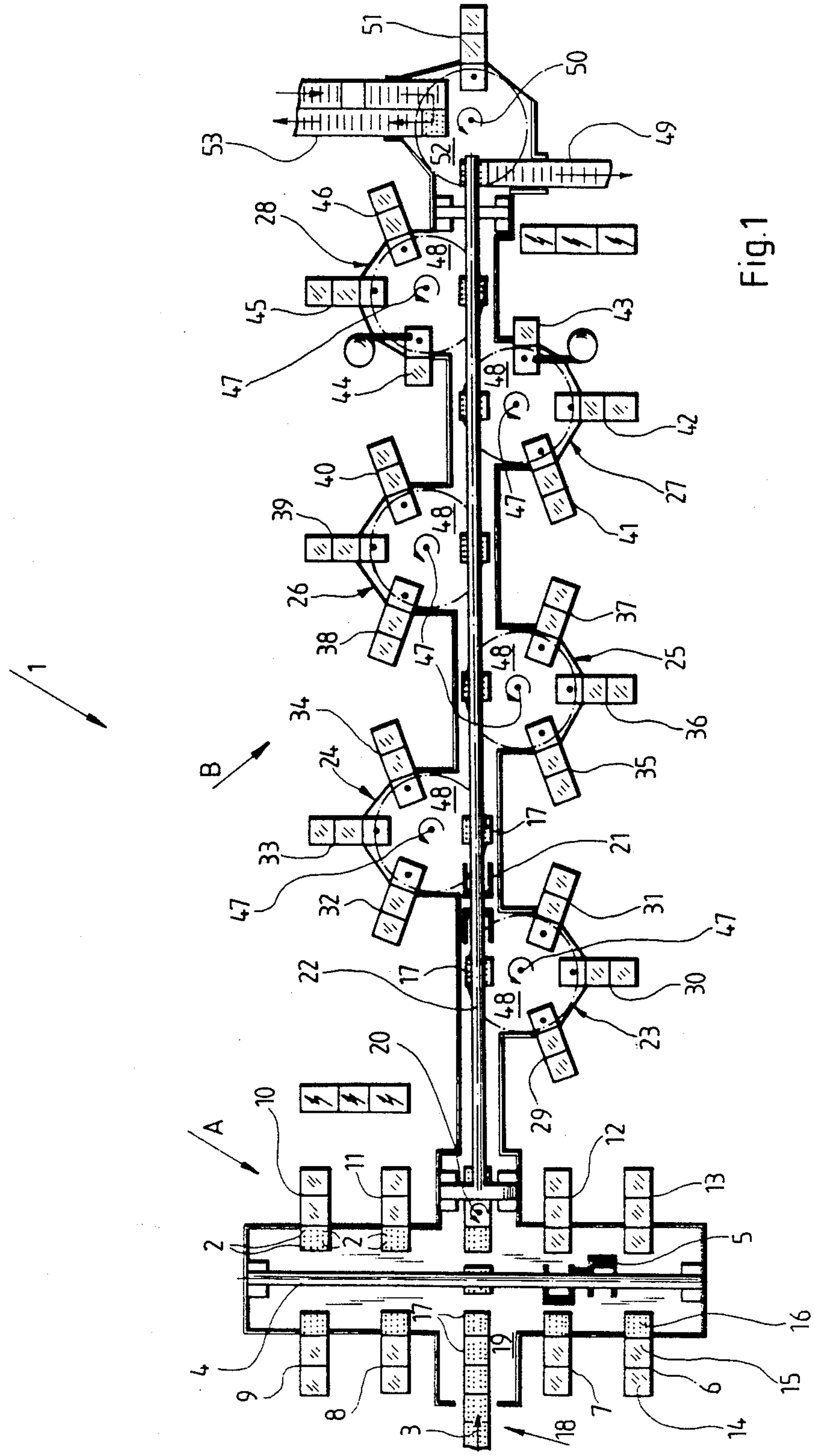
FIG. 1 shows a layout scheme of a line for testing, adjusting and assembling valves.

A test line 1 for inspecting, adjusting and assembling injection valves 2 is divided into a test block A and a test block B. The test block A has a linear portal transport system 4 arranged transverse to the direction of material flow (arrow 3) and having hanging therein a computer-controlled, jointed-arm robot 5, and on either side of the linear portal 4 opposed and mutually aligned test stands 6 to 13. Each of the test stands 6 to 13 comprises a computer cabinet 14, a hydraulic section 15 and a device section 16 that includes the supply connections (not shown) for the valves to be tested. Pallets 17, each holding sixteen injection valves 2, are delivered to the test block A on a pallet delivery conveyor 18 and are stored in a buffer zone 19. The jointed-arm robot 5 distributes the pallets 17 on demand from the test stands 6 to 13; in the operation phase shown in FIG. 1 the test stands 12, 13 have not yet been supplied with a pallet. When the running-in test in stands 6 to 13 of block A has been completed, the robot 5 places the tested pallets on a revolving table 20 in the transfer zone to the second test block B, which can serve as an intermediate store or buffer. The revolving table 20 extends on one side into the handling zone of the steerable robot 5 hanging in the linear portal 4 and on the other side into the handling zone of a jointed-arm robot 21, arranged in block B, of a second linear portal 22 running transverse to the linear portal 4, i.e. in the material flow direction 3.

In test block B six test cells 23 to 28 are arranged on either side of the linear portal 22, each cell comprising three test stands 29 to 31, 32 to 34, 35 to 37, 38 to 40, 41 to 43 and 44 to 46, respectively, arranged in a semicircle. While test stands 29 to 42, 45 and 46 are identical to test stands 6 to 13 of block A, stands 43 and 44 of test cells 27 and 28, respectively, are adapted to insert filters into the injection valves 2. Each of the test cells 23 to 28 has a computer-controlled jointed-arm robot 47 and a stock table 48. The robot 21 of the linear portal 22 supplies the test cells 23 to 28 with pallets 17 and deposits the pallets on the stock table 48; the robots 47 each pick up a single valve from the pallet and distribute the valves to the individual test stands and put the tested valves back on the pallets. In test cells 23 to 26 the valves undergo a leakage test and are calibrated, and in test cells 27 and 28, in stands 43 and 44, respectively, they are first fitted with a filter and then finally tested in test stands 41, 42 and 45, 46, respectively.

Figure 2:
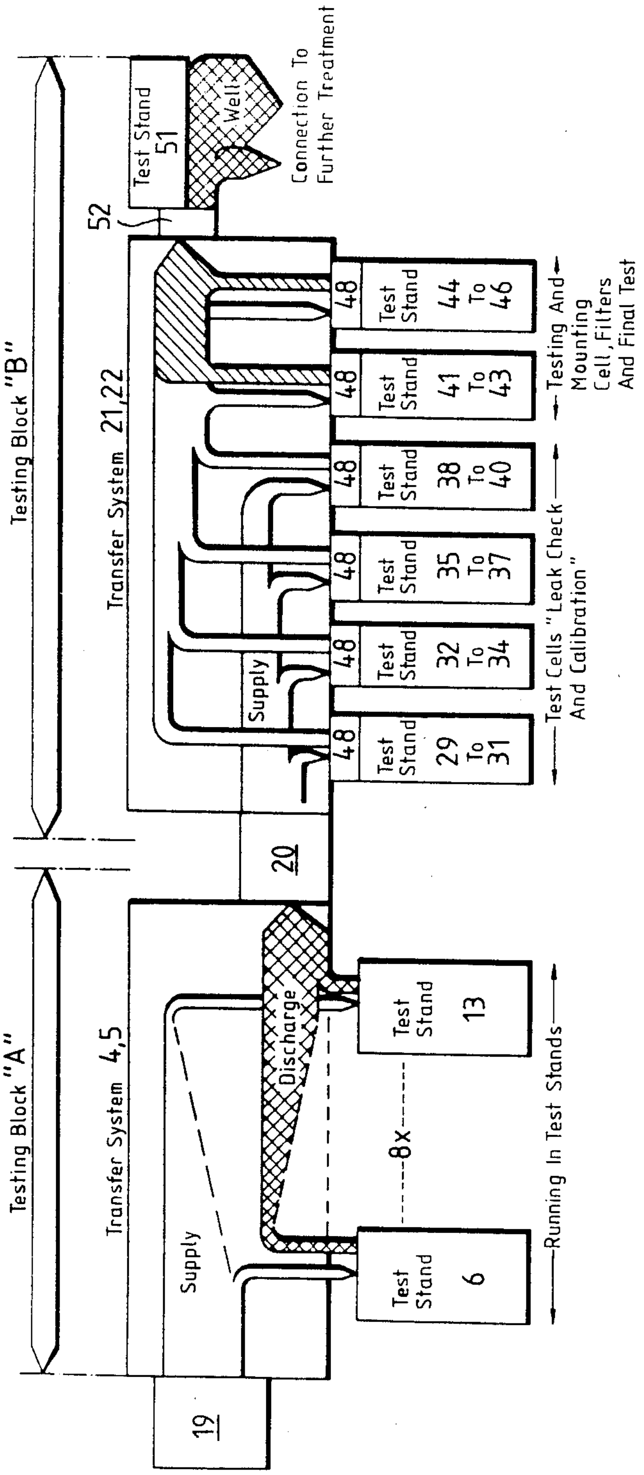
FIG. 2 shows the functions of a modular test line accordng to FIG. 1.

At the end of test block A opposite to the direction of material flow 3 the linear portal extends as far as a pallet removal conveyor 49 which carries away the good-quality injection valves in pallet loads. In the end zone of the linear portal 22 there is a further jointed-arm robot 50 and a test stand 51 for an acceptance test on a sample of the injection valves that have been found satisfactory; a pallet to receive samples is placed on a table 52 in the handling zone of the robot 50. Valves requiring further processing are removed in a transverse conveyor 53. The system of connections of the timing-independent transportation, and of the supply and emptying of the test stands and cells with pallets and/or single injection valves to be tested, under higher-level control, as described above, is shown in FIG. 2; the revolving table 20 and the stock tables 48 and 52 serve as junctions between the test blocks A and B or the test cells and the transfer in the first transport system, comprising the linear portal 4 and the robot 5, and the second transport system in block B, comprising the linear portal 22 and the jointed-arm robot 21.

Figure 3:
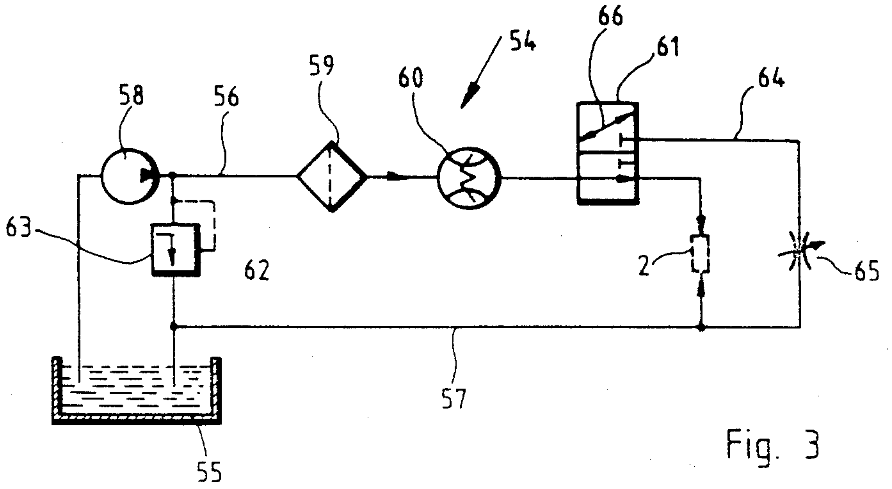
FIG. 3 shows in outline a hydraulic measuring circuit in a test line according to FIG. 1.

FIG. 3 shows a hydraulic measuring circuit in the form implemented in all the test stands. A main supply line 56 leads from a tank 55 to an injection valve 2, shown symbolically; from the valve 2 a tank line 57 leads back into the tank 55. A pump 58 supplies the measuring fluid from the tank 55 via a filter 59, a flow sensor 60 and a multiway valve 61 to the valve 2. A branch line 62 including an integrated pressure regulator 63 leads from behind the pump 58 into the tank 55. The multiway valve 61 can, as desired, be connected to a by-pass line 64 connected to the tank line 57 and including a throttle 65. In the operating phase shown in FIG. 3, the multiway valve 61 is in the position for flow of the measuring fluid from the main supply line 56 to the injection valve 2, i.e. in this case there is no flow of fluid through the bypass line. In contrast to this, during interchange of the injection valve 2 the multiway valve 61 connects the line 56 to the by-pass line 64 via the connection shown symbolically by the arrow 66, so that the flow during the period of exchanging an injection valve is maintained, after only an extremely short time, at a constant value differing only insignificantly from the flow during testing of an injection valve.

Figure 4:
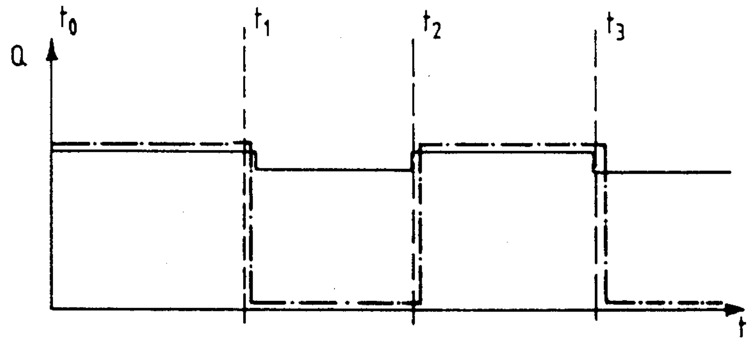
FIG. 4 shows schematically the flow characteristics of a measuring circuit according to FIG. 3.

The diagram, shown in FIG. 4, of the flow Q during time t reproduces the flow conditions in the measuring circuit according to FIG. 3; the dot-and-dash line corresponds to the situation in a known measuring circuit arrangement and makes it clear that the flow during an exchange of test pieces (in the present example injection valves) leads to a complete interruption of the flow in the period between times $t_1$ and $t_2$. In contrast to this, the full line represents the flow conditions in the measuring circuit according to FIG. 3: during an exchange of test pieces the flow is reduced only to an insignificant extent during the short period of changing the multiway valve to the position connecting with the by-pass line 64, and the overall flow conditions are substantially constant.

Figure 5:
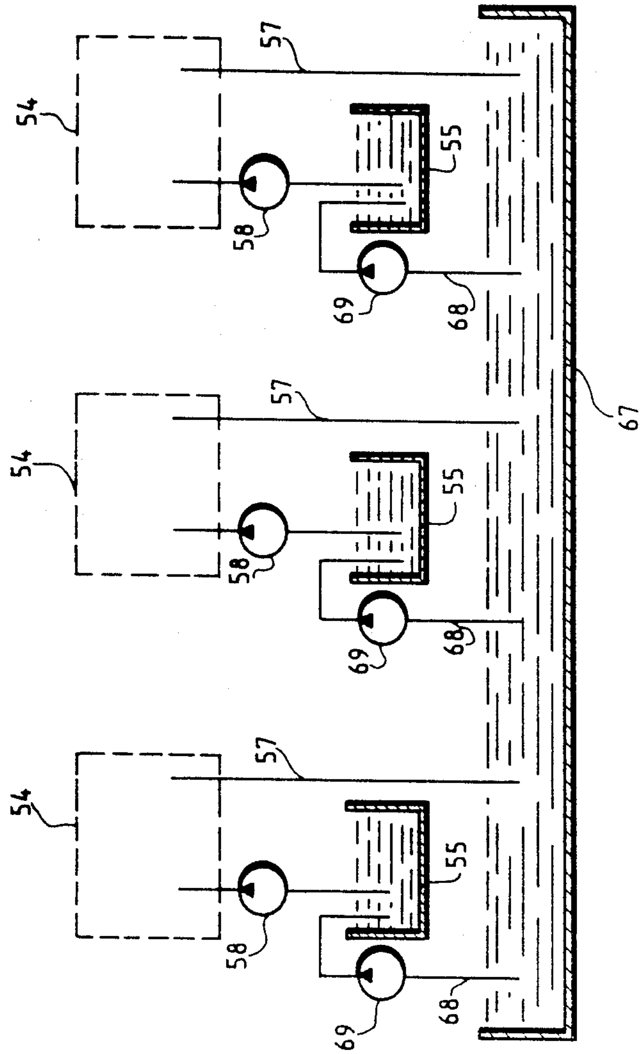
FIG. 5 shows several of the measuring circuits of FIG. 3 connected to a central tank.

As shown in FIG. 5, the measuring circuits 54 of as many test stands as desired are connected directly to a central tank 67 by their tank lines 57; supply lines 68 corresponding to the number of measuring circuits and incorporating pumps 69 lead from the central tank 67 to the tanks 55 of the measuring circuits 54. The central tank makes it possible to exchange the test fluid cyclically by recycling it, thus ensuring uniformity of the properties of the fluid at all the test stands.

Figure 6:
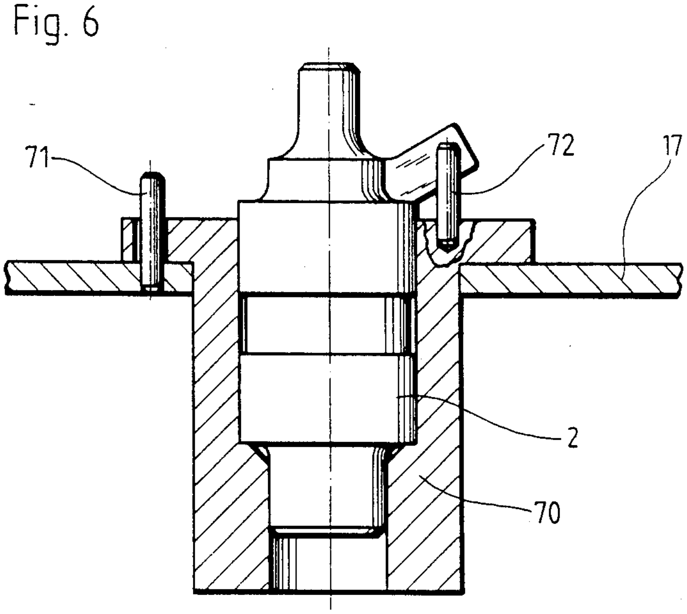
FIG. 6 shows in section a detail of an interchangeable adaptor for a test-piece arranged in a work-piece carrier (pallet)
Figure 7:
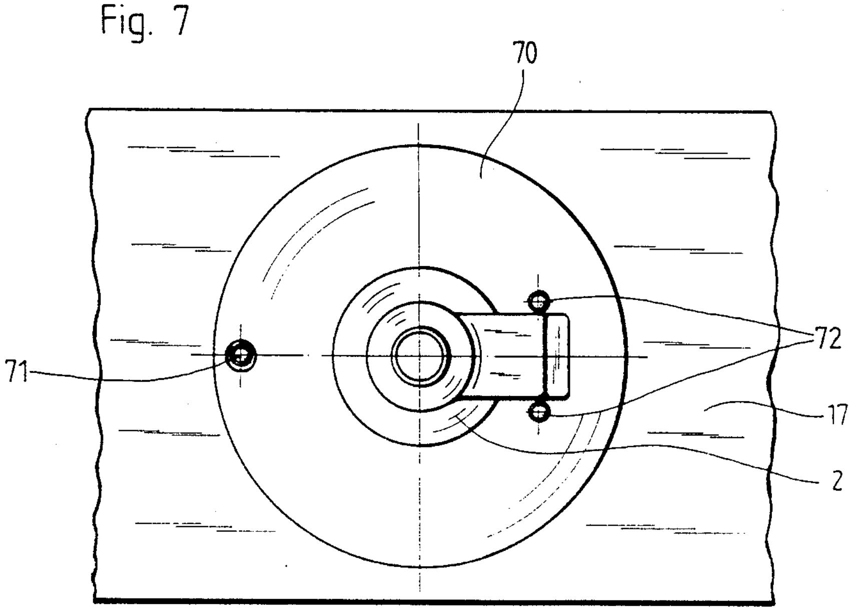
FIG. 7 is a plan view of the part shown in FIG. 6.

According to FIGS. 6 and 7, a test piece 2 is held by an adaptor 70: each pallet 17 can have a number of interchangeable adaptors corresponding to the number of test pieces 2 carried by the pallet 17. The adaptors 70 enable the same pallets 17 to carry test pieces 2 of different dimensions, i.e. in the case of test pieces 2 of other dimensions the pallets 17 do not need to be changed, but only the adaptors 70. Both the adaptors 70 and the test piece 2 are fixed exactly in position in the pallet 17 or the adaptor 70 by pins 71 or 72, thereby ensuring that the connections of the test pieces 2 with the supply connections of the test stands 6 to 13 or 23 to 46 or 51 can be made.

The test line described above in which the test pieces are injection valves can also be used for other test pieces, for example mixture generating systems and components thereof, jets, instruments, pumps and other devices through which a medium flows.

What is claimed is:

1. A process for testing and adjusting valves, especially electronically controlled injection valves for internal combustion engines, wherein the valves arranged in pallets are conveyed by means of a transportation system through a test line consisting of consecutive computer monitored and computer controlled test stands, characterized in that the process comprises the steps:

1. supplying the test stands of a first test block with a pallet carrying the valves by means of a first computer controlled linear portal transportation system, which can be coordinated by an overriding control with the test stand as well as with at least an additional computer controlled linear portal transportation system;
2. simultaneously connecting all of the valves of a pallet to a measuring terminal comprising a hydraulic and an electric current connection for each valve;
   2.1 checking the valves, by
      2.1.1 running in each of the valves connected with the terminal a predetermined time period, and
      2.1.2 performing functional tests, such as determining the circulatory flows or the throughflows;
   2.2 storing the test results in an information carrier of the pallet;
3. clearing the test stands, by
   3.1 picking up the pallets with the tested valves and
   3.2 transporting the pallets with the tested valves into an intermediate storage of the first test block;
4. picking up the tested pallets from the intermediate storage by means of a linear portal transportation system of a second test block;
   4.1 distributing and depositing the pallets in test cells
      4.1.1 for performing a leak test and
      4.4.2 for calibrating the valves;
   4.2 storing the test results in the information carrier of the pallet;
5. picking up, distributing and depositing the pallets in further test cells,
   5.1 in which, to begin with, filters are inserted in the valves and subsequently
   5.2 a final test is performed;
   5.3 storing the test results in the information carrier of the pallet; and
6. clearing the pallets with the fully tested valves by the second linear portal transportation system, including
   6.1 picking up the pallets, and
   6.2 distributing the pallets upon conveyors for additional processing or reworking of valves or for their further transportation.

2. A process according to claim 1, wherein the transport systems and the test stands are coordinated in a manner independent of timing.

3. A process according to claim 1, wherein linear portal transport systems with hanging, integrated industrial robots are used to transport valves in pallets.

4. A process according to claim 1, wherein test stands with integrated industrial robots are used to handle the valves.

5. A process according to claim 1, wherein steps 1 to 4 are followed by an acceptance test on a sample of the fully tested valves.

6. A process according claim 1 wherein, at least at times, there are several pallets with valves in each test cell of the second test block.

7. A device for testing and adjusting valves, especially electronically controlled injection valves for internal combustion engines, said device having a transportation system which conveys the valves arranged in pallets through a test line consisting of successive computer monitored and computer controlled test stands, characterized in that said device includes a first test block A comprising a first linear portal with a computer controlled articulated arm roboter for a run-in test of the valves, extending, transversely to a transportation direction of a pallet feeding device, between test stands aligned opposite each other, said device further including a second test block B and an intermediate storage in a transition region between the first test block A and the second test block B, the second test block B comprising a second linear portal with computer controlled articulated arm roboter, said second linear portal extending in the transportation direction of the pallet feeding device, transversely to the first linear portal, and test cells each having at least two test stands arranged in an operative region of the second linear portal, an articulated arm roboter being integrated into each test cell, said device also comprising a conveyor for conveying said pallets away from the test stand, wherein said first linear portal is coordinated by an overriding control with the test stands in said first test block A, as well as with said second linear portal in said second block B.

8. A device according to claim 7, wherein the second test block B includes six test cells each with three test stands arranged in a semicircle around said articulated arm roboter and in the region of a stock table, of which the first four of the test cells following the intermediate storage, which is in the form of a revolving table, are adapted for a leakage test and subsequent calibration of the valves, and the other two test cells each have an automatic assembly machine for installing a filter, and two test stands for a final test.

9. A device according to claim 7 further comprising a test stand with a jointed-arm robot at the end of the second linear portal.

10. A device according to claim 7, characterized in that each test stand includes a computer, a hydraulic portion and a device part receiving a pallet or an individual valve, and the hydraulic portion includes a hydraulic measuring circuit for testing the valves, having a tank for holding a fluid, a throttle valve, a multipath valve for selectively directing the fluid to the valves to be tested and the throttle valve, and a tank line to which the fluid from the tested valve and the throttle valve is directed.

11. A device according to claim 10, wherein the tanks of the test stands are connected to a central tank.

12. A device according to claim 7, wherein said pallets include interchangeable adaptors for receiving valves of different technical constructions.

* * * * *